Jan. 21, 1958 C. BEAR 2,820,524
TOW TRUCK
Filed Feb. 19, 1954 3 Sheets-Sheet 1

*INVENTOR.*
CLARENCE BEAR
BY
Buckhorn and Cheatham
ATTORNEYS

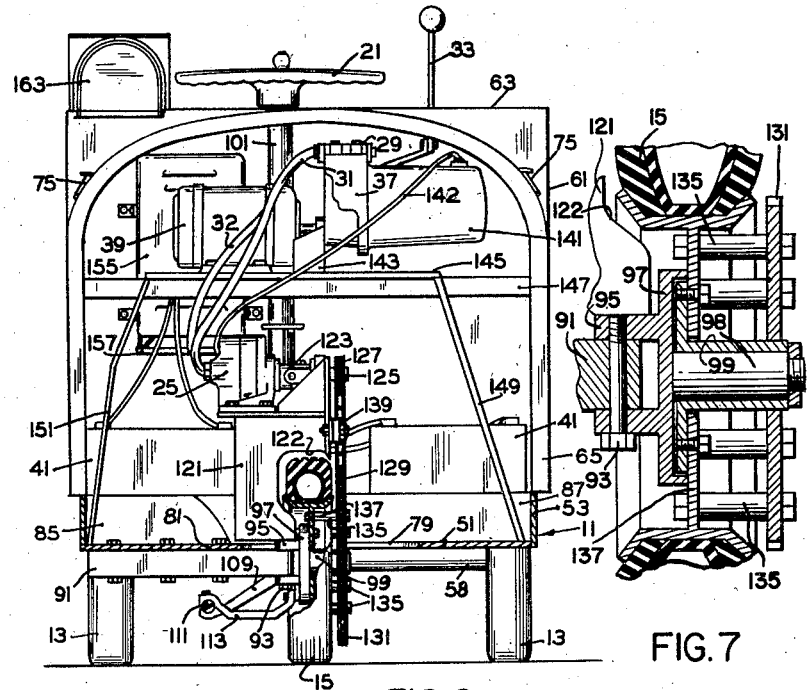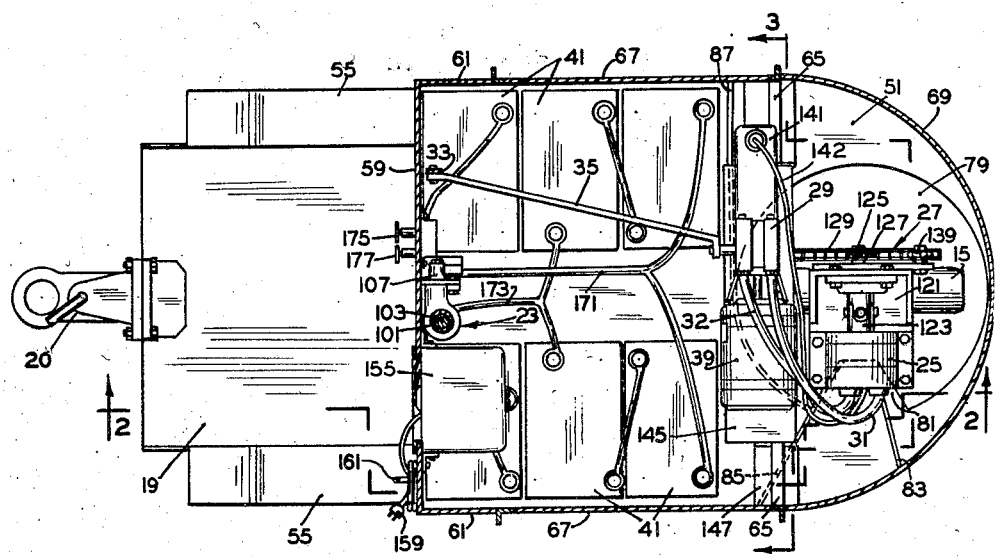

Jan. 21, 1958  C. BEAR  2,820,524
TOW TRUCK
Filed Feb. 19, 1954   3 Sheets-Sheet 3

INVENTOR.
CLARENCE BEAR
BY
Buckhorn and Cheatham
ATTORNEYS

2,820,524
TOW TRUCK

Clarence Bear, Portland, Oreg.

Application February 19, 1954, Serial No. 411,439

2 Claims. (Cl. 180—52)

This invention relates to tow trucks and particularly to tow trucks especially suited for indoor use. A tow truck is that type of industrial truck having an operator's compartment or space from which the operator controls operation of the truck, and having hitch means at the rear of the truck for connection to a vehicle to be towed.

Previous dirigible wheel tow trucks have been expensive due in part to the complicated chassis or frame structure thereof and in part to the complicated manner of mounting and driving the dirigible wheel thereof.

It is a main object of the present invention to provide a dirigible wheel tow truck having a simple and inexpensive frame structure which provides an operator's platform and a support for part of the dirigible wheel driving mechanism.

Another important object of the present invention is to provide a dirigible wheel tow truck having a dirigible wheel mounted and driven in a much simpler manner than theretofore provided.

Various other objects of the present invention will be apparent from the following description taken in connection with the accompanying drawings, wherein:

Fig. 3 is a sectional view in end elevation taken along line 3—3 of Fig. 4, showing among other things the manner of mounting the dirigible wheel.

Fig. 4 is a sectional view in plan taken along line 4—4 of Fig. 2.

Fig. 7 is a vertical section better showing the mounting for the dirigible wheel, the view being on an enlarged scale as compared to Fig. 3.

General Description

Figure 6:
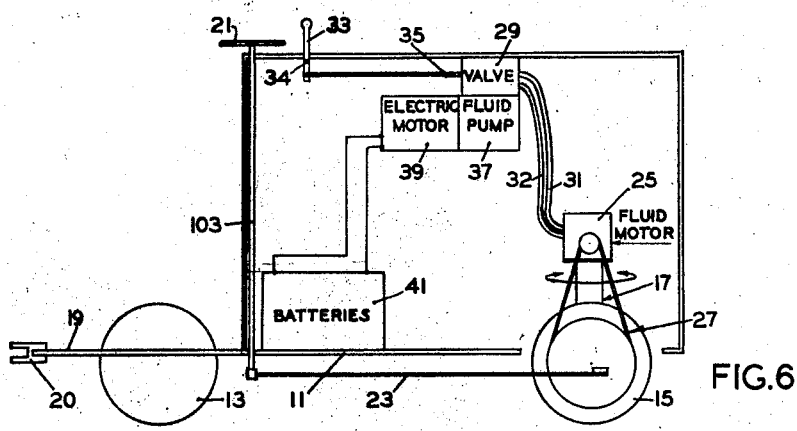
Fig. 6 is a schematic view showing the general relationship of the principal parts of the truck.

Referring to the accompanying drawings wherein similar reference numerals indicate similar parts throughout, the general relationship of the primary parts of the truck is disclosed in Fig. 6. There it is evident that the tow truck has a frame, generally indicated at 11, supported by a pair of rear wheels 13, compare Figs. 6 and 1, and a single dirigible front wheel 15 constituting part of a dirigible wheel structure, generally indicated at 17, which is connected to the frame for turning movement about a vertical axis. Frame 11 includes an operator's platform 19, rearwardly of which is a hitch 20 for connection to a vehicle to be towed, and forwardly of which is located a steering wheel 21 mounted on the frame and operable to steer wheel 15 through a steering mechanism indicated at 23. A loaded platform truck 24 is shown being towed.

Dirigible wheel 15 is driven by a fluid motor 25 which is carried by the dirigible wheel structure and is drivingly connected to the dirigible wheel by a simple chain-and-sprocket drive 27. Adapted to control the flow of hydraulic fluid to the fluid motor 25 is a valve 29 mounted on the frame 11 and operatively connected to the fluid motor by flexible slack conduits 31 and 32 which readily permit turning movement of the fluid motor relative to the valve. A valve control handle 33 is privotally mounted on the frame at 34 and is connected by an actuating rod 35 to the movable valve member of the valve 29.

Hydraulic fluid is supplied to valve 29 by a fluid pump 37 which is driven by a constantly energized, direct current motor 39. The direct current motor is energized by a bank of automotive batteries 41 carried by the frame.

Specific Description

The particular construction of frame 11 shown is merely illustrative and the frame may assume many other forms, and thus the frame shown should be considered merely as a convenient means of supporting the operative elements of the truck. Thus, whatever details of the construction of the frame are hereafter set forth, these are given merely for the purpose of clarifying the explanation.

Frame 11 of the tow truck includes a flat floor plate 51 having a rounded forward end, see Fig. 3, and a narrowed or reduced rear end which constitutes an operator's platform 19. Instead of a platform, a seat could be provided. Either can be considered as a form of an operator's space or compartment. Floor plate 51 has upstanding from the peripheral edges thereof, except for its rear edge, a rim flange 53. Fenders 55 are secured to and project outwardly from the portions of the rim flange at the sides of the operator's platform and overlie the rear wheels 13, which have their axle 57 journaled in a sleeve 58 on the underside of the operator's platform, see Fig. 2.

Mounted on and secured to the floor plate 51 is a housing including a flat rear wall plate 59, flat side plates 61 and a flat top plate 63, which define a rear housing section. Mounted on rim 53 is an open angle iron framework, generally indicated at 65, to which, and to the rim 53, are detachably secured flat side panels 67 and a curved front member 69. Detachably connected to the open framework and the curved member 69 is a curved top front member 71. A hood 73 is provided rearwardly of member 71 and is detachably held in place by extensible hook latches 75 mounted on portions of the open framework 65.

The dirigible wheel structure 17 is accommodated within a generally circular opening 79 formed in the forward portion of floor plate 51, there being an unremoved lug portion 81 on the floor plate projecting into the opening. This lug portion is reinforced by upright flanges 83 and 85, compare Figs. 3 and 4, flange 85 having secured thereto the inner end of a third upright reinforcing flange 87, the other end of which is connected to rim 53.

Figure 2:
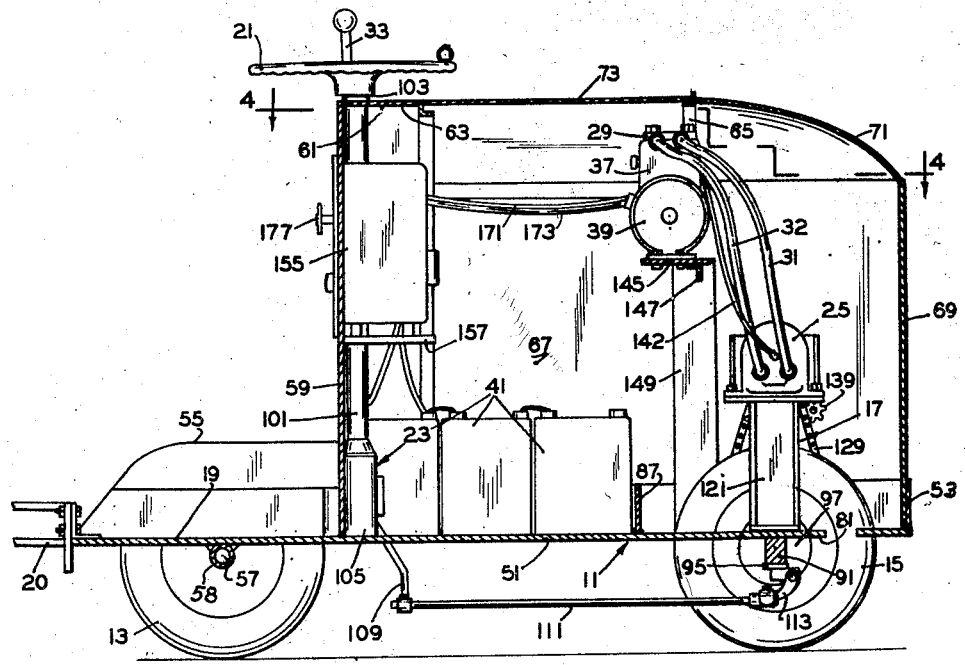
Fig. 2 is a sectional view in side elevation taken along line 2—2 of Fig. 4.

Secured to the underside of the floor plate 51 and extending under the lug portion 81 is an arm 91, compare Figs. 2 and 3, having a cantilever inboard end on which is pivotally mounted the dirigible wheel 15. Referring particularly to Fig. 7, the mounting takes the form of a kingpin 93 extending vertically through the inboard end of the arm and being received within a pair of ears 95 rigid with a wheel mounting member which assumes the form of a conventional spindle carrying drum 97, on the spindle 98 of which the hub 99 of the dirigible wheel is rotatably mounted. It is thus apparent that the wheel may turn or pivot about the kingpin a considerable extent, entirely sufficient for proper steering of the tow truck. In fact, it is apparent from Fig. 4 that the wheel can be turned in excess of 300 degrees.

Provided next to but forwardly of rear wall plate 59 is a fixed vertical steering column 101 rotatably receiving the steering wheel shaft 103 to the upper end of which steering wheel 21 is fixed. The lower end of the steering column 101 includes a sector gear case 105 containing conventional sector gearing connecting the steering wheel shaft 103 to a sector gear shaft 107, see Fig. 4. The sector gear shaft is connected by an arm 109, which in turn is pivotally connected by a rod 111 to a steering link and knuckle 113 carried by the drum 97 of the dirigible wheel. It is evendent that the steering mechanism just described is effective to cause turning movements of the dirigible wheel in response to turning movements of the steering wheel 21.

The fluid motor 25 is of the positive displacement vane type and is mounted on a plate-type framework stand 121 which is secured, such as by welding, compare Figs. 2, 3 and 7, to the upper ear of the pair of ears 95. The drum 97, the ears 95, and the plate 121 constitute a combined wheel and motor support member. The plate framework stand 121 is recessed at 122, see Fig. 3, to accommodate the dirigible wheel. The fluid motor drives, through a universal joint 123, a sprocket shaft 125 carrying a small sprocket 127, shaft 125 being journaled in an upstanding portion of plate framework 121, as is apparent from Figs. 3 and 4. Trained about sprocket 127 is a sprocket chain 129, which is also trained about a considerably larger sprocket 131, which is fixed, such as by standoff bolts 135 to the felly 137 of wheel 15. The felly is secured to the hub 98 in a conventional manner, not shown. A chain tensioning sprocket device at 139 is mounted on plate framework 121 and engages the chain 129 to properly tension the same. It is evident that the chain-and-sprocket drive provides a speed step-down drive between fluid motor 25 and dirigible wheel 15.

The two conduits 31 and 32 extend from fluid motor 25 to valve 29, the valve being mounted on the top of pump 37, there being bolted to the pump a reservoir 141. A flexible, slack leakage return line 142 connects the fluid motor and the reservoir. The unit including valve 29, pump 37 and reservoir 141 is supported by a channel-shaped upright 143 fixed to a supporting plate 145. Plate 145 is fixed to a cross-brace 147 of the open framework 65. The brace is stabilized by arms 149 and 151, compare Figs. 2 and 3.

Direct current electric motor 39, see Fig. 3, is bolted to supporting plate 145 and is drivingly connected to the pump 37. The direct current motor is electrically connected, in a manner to be presently set forth, to a series of independently replaceable automotive batteries, which are generally indicated by the reference numeral 41. There are six batteries shown, which are of the 6-volt type D automotive battery. It is evident that more or less batteries could be employed, or other types of batteries could be used instead, although a feature of the present invention is the provision of a tow truck capable of utilizing inexpensive automotive batteries instead of the expensive industrial battery at present required in electric trucks. In Fig. 4 it is evident that the batteries are arranged in banks or sets of three, arranged to each side of the longitudinal center of the truck and behind flange 87.

Figure 1:
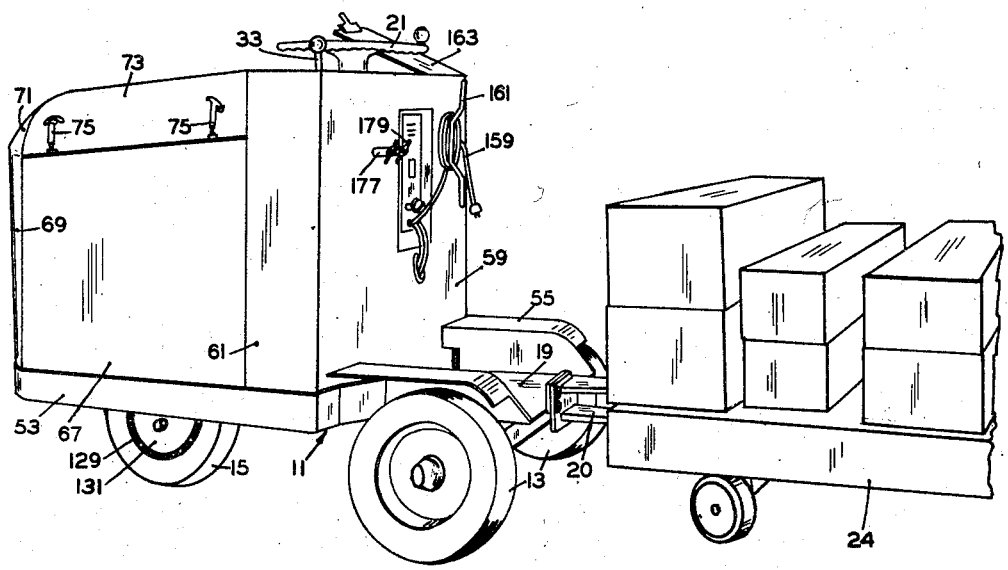
Fig. 1 is a perspective view of a tow truck embodying the concepts of the present invention, the same being shown hitched to a loaded vehicle to be towed.

A battery charger 155 is conveniently mounted on bracket 157 secured to rear wall plate 59 and has its controls accessible through such plate, as is apparent from Fig. 1. A battery charging cable 159 extends from the battery charger and is coiled around a Y-bracket 161 when the tow truck is in operation. When the batteries are to be charged, the cable is uncoiled and plugged into the appropriate outlet. An inclined support 163 is welded to the upper edge of plate 59 for supporting various papers used in connection with keeping accounts relating to the goods hauled, schedules, and the like.

Figure 5:
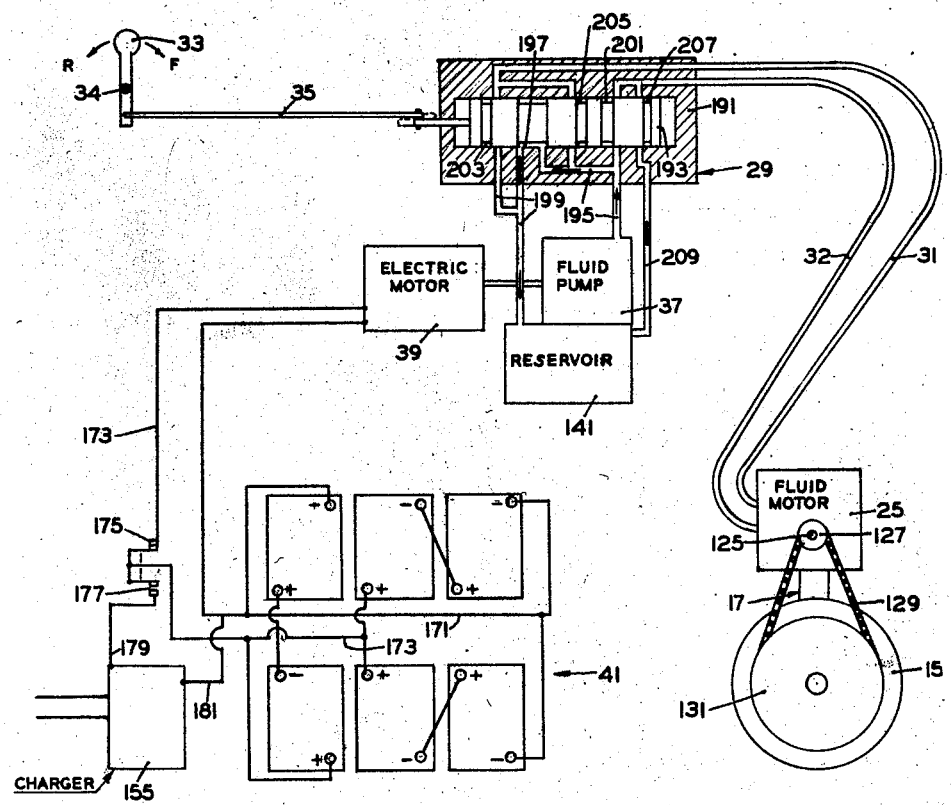
Fig. 5 is a schematic diagram showing the electrical and hydraulic circuits of the truck.

Referring to Fig. 5, the schematic diagram shows the essential electrical and hydraulic connections of the truck more in detail than is disclosed in Fig. 6. Referring first to the batteries 41, these batteries are connected in series-parallel relationship, wherein the batteries are paired in series and the three pairs are connected in parallel to provide a 12-volt output. More particularly, it is evident that the two upper right-hand batteries are connected in series, the two lower left-hand batteries are connected in series and the upper left-hand and lower left-hand batteries are connected in series. The above mentiond three pairs are connected in parallel to a ground conductor 171 and a hot side conductor 173.

Interposed in conductor 173 is an off-on switch 175 which preferably is connected in tandem to operate in unison with a normally open battery charger switch 177. Both switches have control handles projecting through rear wall plate 59, see Figs. 2, 3 and 4. The normally open battery charger switch is operable when closed to connect a conductor 179 from the battery charger to conductor 173. The battery charger is also connected by a conductor 181 to conductor 171. With switches 175 and 177 connected in tandem, it is apparent that the battery charger cannot be connected to the batteries at the same time that the batteries are connected to the direct current motor 39.

Valve 29 includes a body 191 within which is slidably disposed for endwise movement a spool 193. The spool constitutes the movable valve member of the valve and is connected, as shown, to the actuating rod 35. The valve is conventional in construction and is not, per se, a part of the present invention. Suffice it to say, when the valve is in the hold position shown in Fig. 5, hydraulic fluid from vane pump 37 will be circulated through output or high pressure line 195, in accordance with the arrows shown, to the valve and then through a spool groove 197 immediately back to the reservoir through a low pressure line 199.

However, when the control handle 33 is pivoted in a counterclockwise direction, the spool 193 is shifted to the right to direct the fluid in line 195 through groove 201 in the spool valve to conduit 32. Conduit 31 will be connected through a groove 203 to the low pressure line 199. Under these conditions the tow truck is driven rearwardly. When the control handle 33 is shifted from the hold position, shown in Fig. 5, clockwise, the spool 193 is shifted to the left so that fluid from high pressure line 195 is conducted through a groove 205 to conduit 31, and conduit 32 will be connected by a groove 207 to a second low pressure line 209.

It is evident that with a valve as above described, the speed of the truck may be regulated by the operator by merely adjusting the position of the control handle one way or the other to decrease or increase the speed as desired. Until the control handle is fully moved in one direction some fluid will continue to flow through the return groove 197, the amount of fluid flowing through groove 197 being proportionate to the distance the control handle 33 is moved from its central hold position.

In operation, the operator will throw the switch 175 to its "on" position maintaining the control handle 33 in its neutral or hold position. Here the vehicle is effectively braked by the trapped fluid in conduits 31 and 32. The direct current motor 39 will now reach its rated no-load speed and for the remainder of the operating period of the truck will be constantly energized and will constantly drive the vane pump 39. Only a negligible load will be imposed on the direct current motor at this time since the fluid from the vane pump may freely return unimpeded to the storage reservoir through return groove 197 in the valve.

When the operator desires to set the tow truck in motion, he will move the control handle 33 in the desired direction to partially or totally direct fluid from the vane pump into one or the other of conduits 31 or 32. Load will be imposed on the direct current motor, because of fluid being circulated through fluid motor 25, to cause movement of the truck, while the motor is operating at its rated no-load speed. The speed of the direct current motor, therefore, drops toward its rated full load speed, but the amount of current drawn from the batteries under these conditions will be considerably less than that drawn were the load imposed on the direct current motor when it was at rest. Thus, the life of the batteries 41 is considerably prolonged over that which would be the case were the direct current motor required to commence operation under load.

By the present invention, a low cost tow truck having low cost operating characteristics has been provided. The low cost of the truck is primarily attributable to the fact that the prime mover means constitutes low cost components available on the market, and the fact that these components are so mounted and arranged on the truck as to achieve simple, inexpensive control and drive arrangements. The low operating cost is primarily attributable to the absence of heavy drain resistance grids, and the provision of a system where the electric motor is operating at its rated no-load speed when load is imposed thereon.

The truck of the present invention is ideally suited for use indoors where exhaust fumes would be objectionable, although it is appreciated that the truck is also adaptable for outdoor use.

A still further advantage of the truck of the present invention is that when the truck is idle the battery charging cable or cord 159 may be quickly plugged into a suitable outlet and the batteries charged.

Having described the invention in what is considered to be the preferred embodiment thereof, it is desired that it be understood that the invention is not to be limited by the specific details shown unless they constitute critical features of the present invention, all of which will be apparent by reference to the following claims.

I claim:

1. In a tow truck having a frame, wheel means supporting said frame including a dirigible wheel structure, said frame being formed with an opening accommodating said dirigible wheel structure, said dirigible wheel structure including a wheel mounting member and a wheel rotatably mounted on said mounting member for rotation about a horizontal axis, a cantilever supported arm on said frame projecting into said opening, a vertical kingpin connecting said arm and mounting member for turning movement of said mounting member and wheel relative to said frame about a vertical axis, motor means located on the same side of said wheel as said kingpin and mounted on said mounting member to move therewith, said motor means having a shaft projecting over said wheel in spaced relation therefrom, and flexible drive means located on the side of said wheel remote from said kingpin and being drivingly connected between said shaft and said wheel, and steering means connected to said mounting member for turning said dirigible wheel.

2. In a tow truck having a frame, wheel means supporting said frame including a dirigible wheel structure, said frame being formed with an opening accommodating said dirigible wheel structure, said dirigible wheel structure including a wheel mounting member and a wheel rotatably mounted on said mounting member for rotation about a horizontal axis, a cantilever supported arm on said frame projecting into said opening, a vertical kingpin connecting said arm and mounting member for turning movement of said mounting member and wheel relative to said frame about a vertical axis, motor means mounted on said mounting member to move therewith, flexible drive means located on the side of said wheel remote from said kingpin and being drivingly connected between said motor and said wheel, and steering means connected to said mounting member for steering said wheel.

References Cited in the file of this patent

UNITED STATES PATENTS

| Number | Name | Date |
|---|---|---|
| 1,185,630 | Carr | June 6, 1916 |
| 1,461,642 | Allen | July 10, 1923 |
| 1,607,236 | Bumstead | Nov. 16, 1926 |
| 1,711,223 | Burger et al. | Apr. 30, 1929 |
| 1,715,639 | Burrows | June 4, 1929 |
| 2,178,367 | Dunham | Oct. 31, 1939 |
| 2,299,445 | Weaver | Oct. 20, 1942 |
| 2,320,600 | Howell | June 1, 1943 |
| 2,394,854 | Goodman | Feb. 12, 1946 |
| 2,507,357 | Stoner | May 9, 1950 |
| 2,681,117 | Marcy | June 15, 1954 |

FOREIGN PATENTS

| Number | Country | Date |
|---|---|---|
| 551,569 | Germany | June 2, 1932 |
| 179,730 | Great Britain | May 18, 1922 |